United States Patent [19]

Murai et al.

[11] 4,107,249

[45] Aug. 15, 1978

[54] METHOD FOR FORMING AN ANNULAR GROOVE IN A THERMOPLASTIC PIPE

[75] Inventors: Sadao Murai; Nobuo Goto, both of Hirakata; Katsuhiko Tanioka, Asaka; Masaaki Matsunaga, Otsu; Riyoiti Isayama, Asaka, all of Japan

[73] Assignee: Sekisui Kagaku Kogyo Kabushiki Kaisha, Osaka, Japan

[21] Appl. No.: 666,372

[22] Filed: Mar. 12, 1976

[30] Foreign Application Priority Data

Mar. 12, 1975 [JP] Japan .................. 50-30340
Mar. 12, 1975 [JP] Japan .................. 50-30341

[51] Int. Cl.² .......................................... B29C 17/02
[52] U.S. Cl. ................................ 264/68; 264/94; 264/296; 264/322; 425/387.1; 425/393; 425/DIG. 218
[58] Field of Search .................. 264/322, 68, 88, 89, 264/92, 94, 296; 425/387, 392, 387.1, 393, DIG. 218

[56] References Cited

U.S. PATENT DOCUMENTS

| | | | |
|---|---|---|---|
| 2,977,633 | 4/1961 | Breitenstein | 264/94 |
| 3,271,489 | 9/1966 | Fogelberg | 264/94 |
| 3,272,896 | 9/1966 | Winchester | 264/98 |
| 3,278,665 | 10/1966 | Harrison | 264/312 X |
| 3,706,519 | 12/1972 | Soethje | 264/322 X |
| 3,773,456 | 11/1973 | Salz | 425/392 X |
| 3,823,216 | 7/1974 | Petzekais | 264/89 |
| 3,825,392 | 7/1974 | Ligon | 264/322 X |
| 3,861,847 | 1/1975 | Barnett | 264/94 X |
| 3,940,227 | 2/1976 | Strasser | 425/DIG. 18 |
| 3,960,472 | 6/1976 | O'Connor | 425/DIG. 18 |
| 3,989,439 | 11/1976 | Schmitzberger | 264/296 X |
| 3,991,150 | 11/1976 | Putter | 264/68 |

*Primary Examiner*—Thomas P. Pavelko
*Attorney, Agent, or Firm*—Sughrue, Rothwell, Mion, Zinn and MacPeak

[57] ABSTRACT

An annular groove is formed in the periphery of thermoplastic pipe near an end thereof by combining the forces of a fluid under pressure and a rigid expandable core mold. A pipe is heated, softened and placed over a core mold having an extensible portion. The extensible portion is in the retracted state initially and presents no obstacle to the placement of the pipe on the core mold. A space is provided internally of the pipe and is sealed by parts of the core mold whereby the application of a fluid pressure pushes outwardly on the inner periphery of the pipe. At the same time or subsequently the extensible portion of the core mold is extended to provide additional pressure to and to shape the latter internal periphery of the pipe.

3 Claims, 8 Drawing Figures

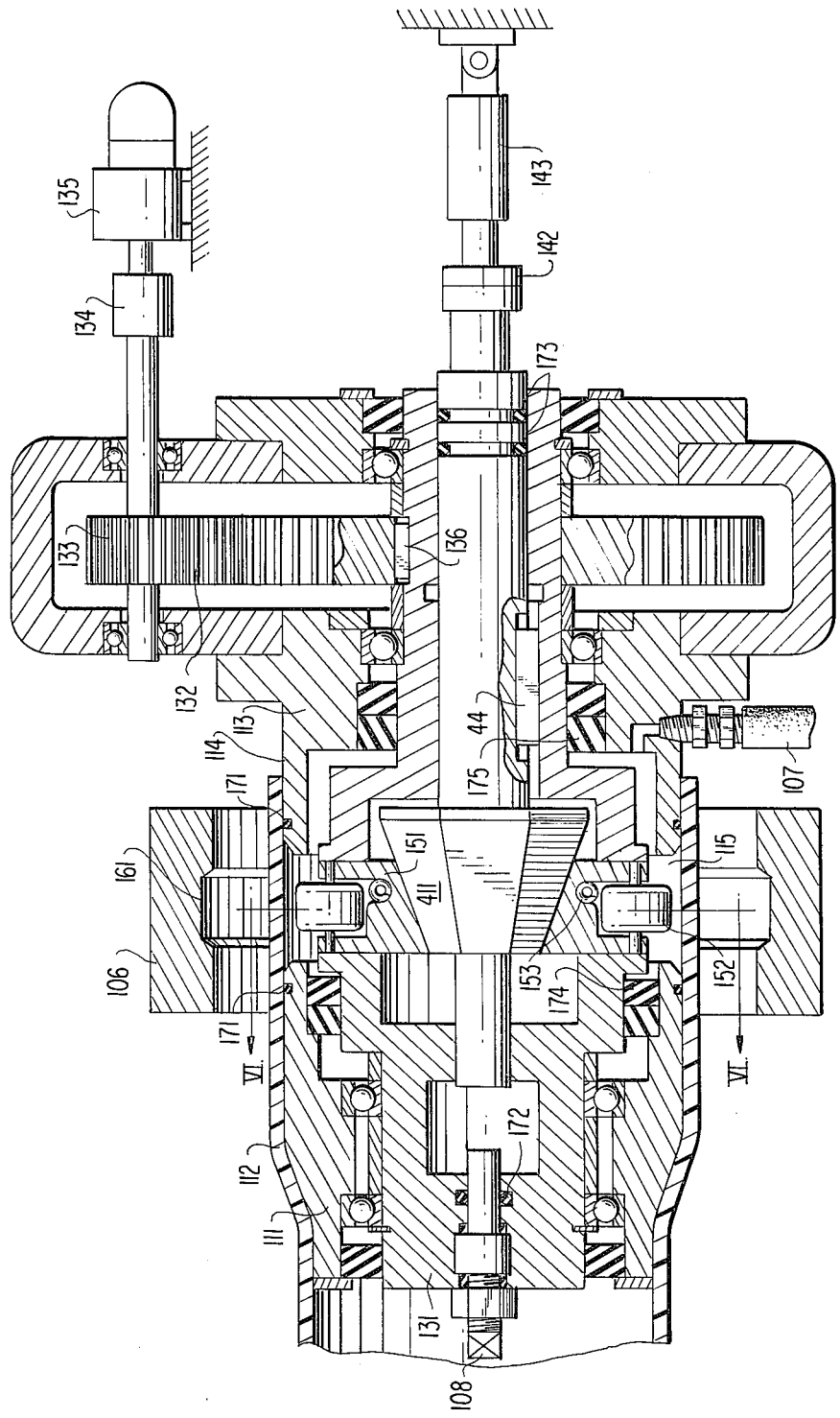

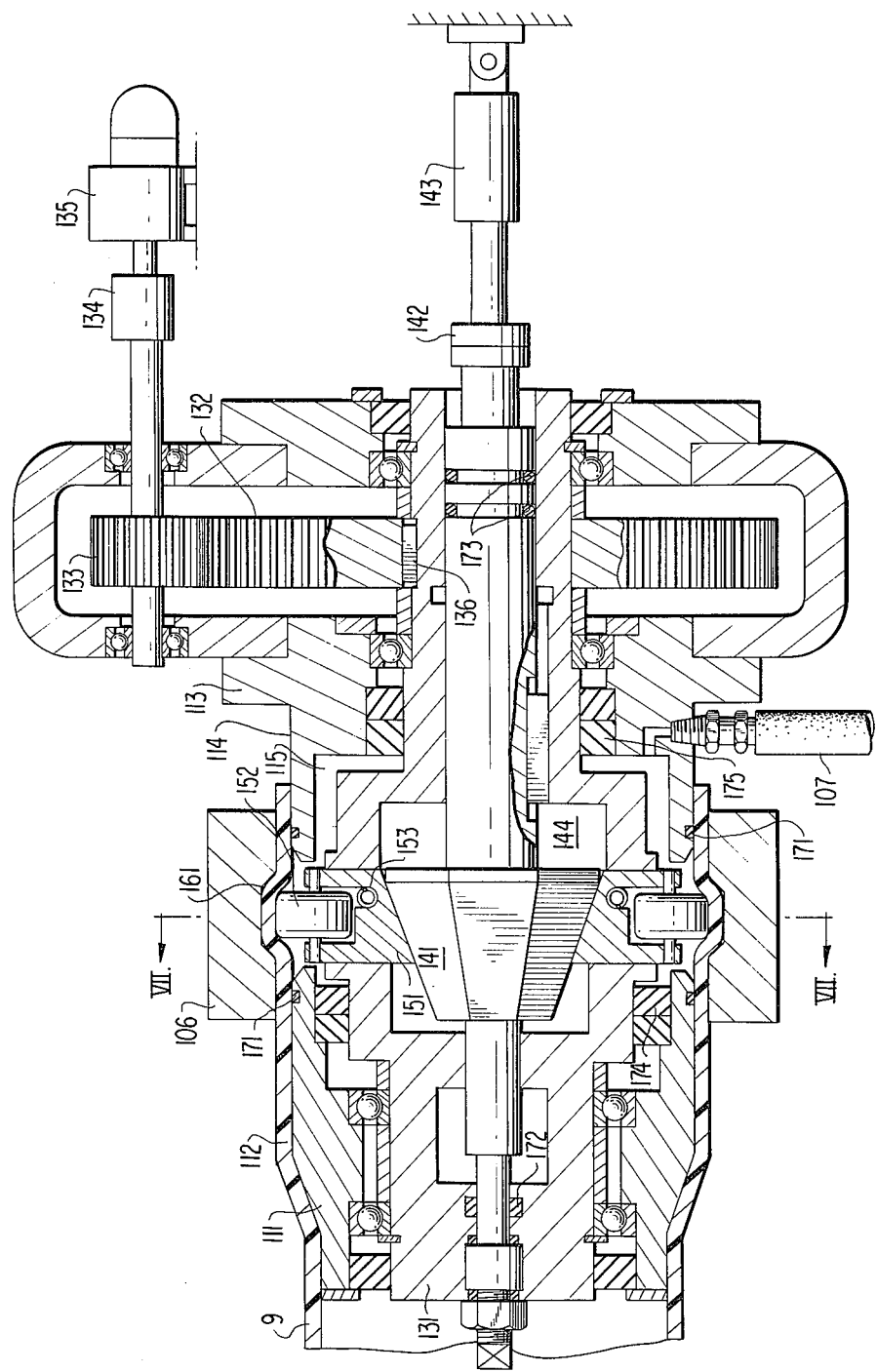

METHOD FOR FORMING AN ANNULAR GROOVE IN A THERMOPLASTIC PIPE

BACKGROUND OF THE INVENTION

This invention relates to a method for forming a groove of precise dimension at the end of a thermoplastic pipe said annular groove being adapted to receive a gasket ring therein for the purpose of the connecting the end of the pipe to another tube or pipe.

Heretofore, various methods for forming an annular groove near the end of a tube have been proposed. According to the so-called blow molding method, an outer mold having an annular groove is placed over the end of the pipe. The pipe is heated and softened and a fluid pressure is applied to the interior of the end to expand the part thereof underlying the annular groove. In that method, although a comparatively accurate shaping of the outer surface of the part is obtained, there is inaccurate shaping of the inner surface, which is to receive the gasket ring. Hence the latter method is used only for low pressure, thin pipes.

Another method, disclosed in Japanese Patent Publication No. 5273/1973 wherein a formed ring made of an elastomer is expanded radially, is not suffieiently accurate for shaping the outer circumference after the elestomer has been expanded, and furthermore the duration of the formed ring made of the elastomer becomes a problem.

Another method, known as the beading method and more commonly applicable to metal pipes, has been proposed for thermoplastic pipes in Japanese Patent Publication No. 23112/1967 (Also see British patent specification No. 997,552). The apparatus used in the method includes a split metal mold having a plurality of segments made of a rigid material and capable of forming a continuous cylindrical surface when extended to predetermined positions. The segments have outer peripheries, respectively, which are segments of the circumference of a circle, and when the segments are fully extended their outer peripheries meet to form a continuous circle of a diameter corresponding to the desired inner diameter of the annular enlargement to be formed. However, prior to full extension the segments do not meet to form a continuous circle. Consequently if the segments are in a retracted position when the pipe is placed on the core mold, as the segments are later extended the sharp edges of some of the segments will contact and abrade the inner surface of the tube, thereby preventing the formation of a smooth inner surface. For this reason, the Japanese Patent Publication No. 23112/1967 teaches that the split metal mold is extended before its insertion into the softened pipe. In order that the split metal mold can be inserted into the softened pipe smoothly, a transition surface must be provided at the forward stage of the metal mold. Such a procedure makes it difficult to obtain a wall which is substantially perpendicular to the axis of the pipe at one side of the groove for receiving the gasket ring. The groove produced by the latter method is not satisfactory for receiving a gasket ring.

In still another method, as disclosed in Japanese Utility Model Publication No. 5925/1941, a plurality of rollers are rotated around the axis of the core mold while they are extended to abut against the internal surface of the pipe to form an annular groove. This method and apparatus are well adapted to form an annular groove in a metal pipe, but cannot be satisfactorily applied to a material such as a thermoplastic pipe whose softening temperature is comparatively low and elastic deformation limit is comparatively high. Even if the rollers are rotated at a high speed along the internal surface of the pipe, while the pipe is being cooled and solidified, the parts not instantly contacting the rollers tend to be restored to their original positions by the resilience of the pipe material. For this reason, the rotating speed of the rollers must be elevated and the number of the rollers must be increased beyond that which is practical. The external friction between the rollers and the pipe wall and internal friction due to the repeated local deformations generate heat which retards the solidification of the pipe and changes the color of the pipe wall. For this reason, the rotating speed of the rollers cannot be elevated. Since the number of the rollers is restricted by the requirement that they must be retractable and since the rotational speed cannot be too great it has been difficult to correct the deficiencies of this method as applied to a thermoplastic pipe.

SUMMARY OF THE INVENTION

The present invention overcomes the above disadvantages inherent in the segmented extensible core mold and in the core mold having rollers. Whichever apparatus is used, the method of the present invention includes the step of applying fluid pressure to the inner part of the pipe to be expanded prior to or simultaneously with the mechanical pressure from the segments or rollers.

According to this invention, the end of a thermoplastic pipe is forced over a core mold, and a split-type outer mold having an annular groove is placed on the outer surface of the end of the pipe. In one embodiment a rigid mold included in the core mold comprises an plurality of extensible segments which abut one another, when in their extended state, to form a continuous cylinder whose outer periphery is larger than the inner periphery of the pipe. For insertion and removal from the pipe the segments can be retracted within the periphery of the core mold. A fluid pressure is applied to the interior of that part of the pipe forced over the core mold prior to or simultaneous with the extension of the segments thereby to assist the formation of an annular groove.

In another embodiment rollers included in the core mold can be retracted within the periphery of the core mold and can be projected in excess of the outer periphery of the core mold. The rollers are projected and rotated, thereby forming an annular groove in the thermoplastic pipe. The rollers are then retracted after the pipe is cooled and solidified to permit removal of the pipe with the annular groove from the core mold. A fluid pressure is applied to the interior of that part of the thermoplastic pipe forced over the core mold prior to or simultaneous with the extension of the rollers thereby to enlarge that part of the pipe wall.

BRIEF DESCRIPTION OF THE DRAWINGS

FIG. 5 is a cross sectional side view of a core mold having rollers in the retracted state.

FIG. 7 is a cross sectional view of the apparatus of FIG. 5 with the rollers in the extended state.

DETAILED DESCRIPTION OF THE INVENTION

Figure 1:
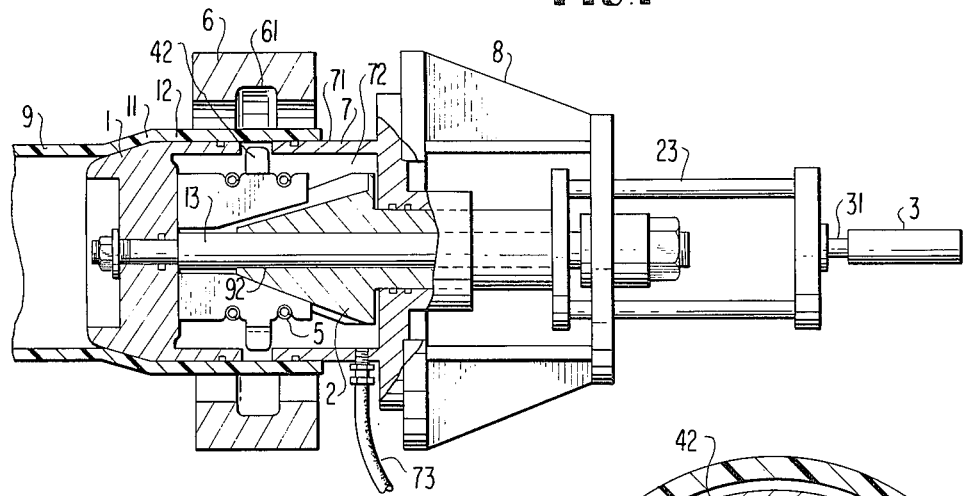
FIG. 1 is a cross sectional side view of a core mold having segments in the retracted state.

Referring first to FIGS. 1–4, an embodiment of the invention having a segmented part in the core mold will be described. The numeral 1 designates a forward core mold having a forward sloped-surface portion 11, for facilitating the insertion of the core mold into the heated and softened end of pipe 9, and a large diameter portion 12 following the sloped-surface portion 11, for extending the end of pipe 9 to form a socket adapted to receive an end of another pipe to be connected with pipe 9. The forward core mold 1 is secured to a central rod 13. A conical shaped core 2, having an even number of axial grooves 21 and 22 in the outer surface thereof, is slidably mounted on the central rod 13 and O rings 92 are provided to seal the gap between the core 2 and the central rod 13. The core 2 is rearwardly connected through levers 23 to a piston rod 31 reciprocable in a fluid pressure cylinder 3 so that the core 2 can slide reciprocally along the central rod 13.

Numerals 41 and 42 designate segments of two separate groups, respectively. Each group consists of a plurality of such segments for forming the annular groove on the end of pipe 9. When the core 2 advances forwardly, the segments 41, which have extensions contacting the bottom of the sloped grooves 21, are pushed radially outwardly. This causes segments 41 to push the other segments 42 radially outwardly with the beveled surfaces of the segments 41 slidingly contacting with underside of segments 42 arranged on both sides thereof.

Figure 2:
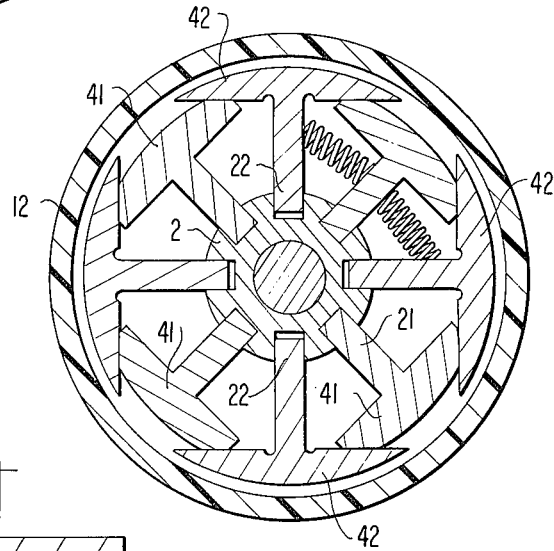
FIG. 2 is a sectional view along the line II—II in FIG. 1.
Figure 3:
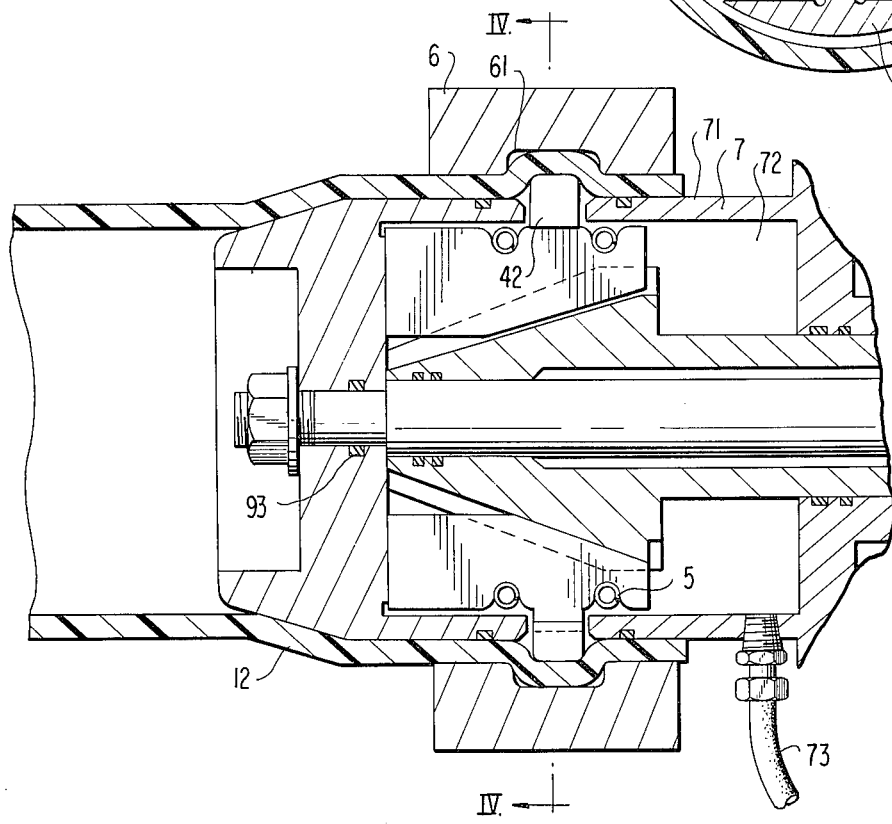
FIG. 3 is a cross sectional side view of the apparatus of FIG. 1 with the segments in the extended state.
Figure 4:
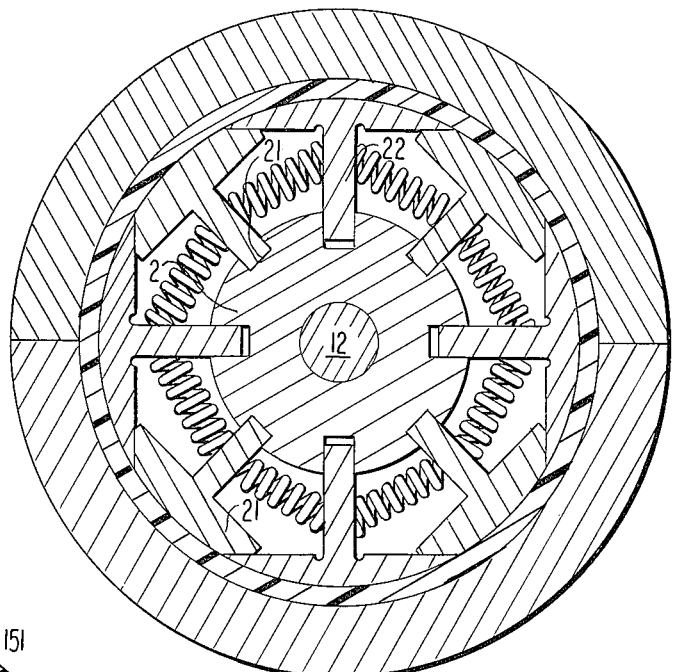
FIG. 4 is a sectional view taken along the line IV—IV in FIG. 3.
Figure 6:
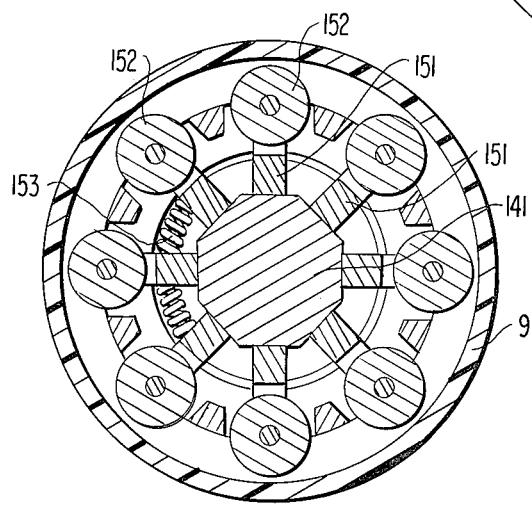
FIG. 6 is a cross sectional view taken along the line VI—VI in FIG. 5.
Figure 8:
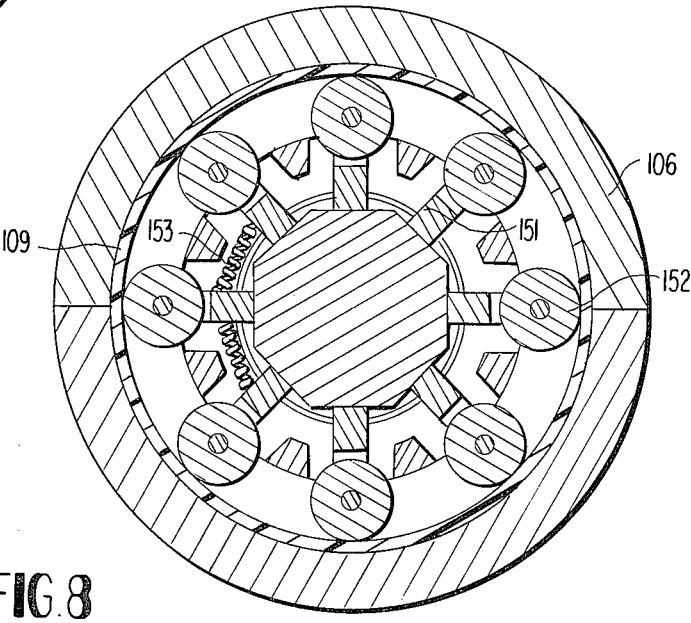
FIG. 8 is a cross sectional view taken along the line VII—VII in FIG. 7.

As a result, the segments 41 and 42, which are initially retracted as shown in FIGS. 1 and 2 to a diameter less than that of the greater diameter portion 12 of the end of pipe 9, are ultimately extended as shown in FIGS. 3 and 4 to a diameter in excess of that of the greater diameter portion 12. When in the extended state, the outer peripheral surfaces of the segments 41 and 42 form a continuous cylindrical surface which forms the desired groove at the end of pipe 9. The segments are preferably selected so that the segments 42 have a total surface angle which is as small as possible bearing in mind the requirement that they must be retracted within the diameter 12 of the core mold. This feature further reduces the uneven surface effect created as the segments 42 engage the pipe 9 prior to the engagement of pipe 9 by the segments 41.

A plurality of springs 5, connected between the stems of adjacent segments are tensioned in the circumferential direction to bias the segments in the retracted state. Thus, when the core 2 is moved rearwardly by the pressure cylinder 3, the springs 5 bias the segments in the direction to cause bottom parts of the stems of the segments 41 to remain in contact with and to slide in the grooves 21. The stems of segments 42 will remain in and slide in the grooves 22, but will not contact the bottoms thereof because the beveled edges of segments 41 remain in contact with the undersides of segments 42.

Numeral 6 designates a split outer mold having an annular groove 61 on the inner surface thereof. The split outer mold 6 can be tightened or released by a driving device separately provided, and is located at a position over the greater diameter portion 12 between the forward core mold 1 and the rearward core mold 7, so that the annular groove 61 of the outer mold 6 confronts the segments 41 and 42. The rearward core mold 7 is placed outward of the core 2 and fixed to the frame 8 of the core mold assembly together with the central rod 13. The outer periphery 71 of the rearward core mold 7 has a diameter equal to that of the greater diameter portion 12 of the forward core mold 1.

A gap or space 72, between the forward core mold 1, the rearward core mold 7, and the thermoplastic resin tube 9, is sealed by O-rings 91, 92, 93, and 94 provided at required positions for preventing leakage of the pressurized fluid, and a fluid pipe 73 is connected thru mold 7 to space 72 for introducing a pressurized fluid therein.

The method for forming the annular groove in the thermoplastic pipe by the use of the device of FIGS 1–4 will now be described.

A thermoplastic resin pipe 9 having an end heated and softened by a separate heating device is forced over the core mold assembly to an extent where the end of the tube 9 reaches over the greater diameter portion 12 of the forward core mold 1 to a predetermined position on the greater diameter surface 71 of the rearward core mold 7. The pipe end thus expanded forms a socket portion for subsequent connections. The split type outer mold 6 is located as described previously and tightened. A pressurized fluid is introduced into the space 72 through the pipe 73, thereby to expand the wall of the pipe 9 confronting the annular groove 61. It is apparent that some other supplemental measures such as providing a vacuum pump connected to the annular groove 61 of the outer mold 6 and evacuating the same groove may be provided beside the above described arrangement. In either case, the pressure of a fluid, e.g., air, is greater on the inner periphery than on the outer periphery.

Immediately after or simultaneous with the introduction of the pressurized fluid, the piston rod 31 in the fluid pressure cylinder 3 is moved forward thereby to extend the segments 41 and 42. Thus, the part of the thermoplastic pipe 9 underlying the annular groove 61 of the outer mold 6, which has been somewhat expanded by the application of the pressurized fluid, is thereby further expanded until the segments 41 and 42 are ultimately brought into aligned positions and the outer surfaces of the segments 41 and 42 form a continuous cylindrical surface. It is advantageous if the pressurized fluid is released when the segments are brought into the ultimate positions. Likewise, it is preferable to provide a space or gap between the bottom of the annular groove 61 and the outer surface of the enlarged part of the thermoplastic resin pipe 9 thereby to permit full extension of the segments 41 and 42. Setting of the fully extended positions of the segments 41 and 42 may be carried out by adjusting the contact between the forward core mold 1 and the forward surface of the core 2, or by adjusting the stroke of the piston rod 31. The pipe end 9 is then cooled suitably, for instance, by sending a coolant such as water or air into the annular groove 61 of the outer mold 6, or pouring water onto the outer surface of the tube 9 near the molding assembly, or by circulating a coolant through passages provided through the forward core mold 1 and the rearward core mold 7. After the end of pipe 9 has been cooled, the core 2 is moved rearwardly by the operation of the fluid pressure cylinder 3, and the segments 41 and 42 are retracted by the force of the springs 5. The outer split mold 6 is then opened, and the core mold consisting of the forward and rearward core molds 1 and 7 is pulled out of the tube end 9.

Accordingly the part of the pipe to be formed into a groove is somewhat expanded by the application of the pressurized fluid prior to or simultaneously with the extension of the segments 41 and 42. With this arrangement, the harmful effect normally caused by the sharp edges of the outwardly arranged segments 42 being brought into contact with the inner surface of the pipe 9 before contact with the rest of the segments 41, can be substantially eliminated, and an expanded portion having precise dimensions and having a smooth internal surface can be obtained.

Furthermore, since the pipe 9 is previously or simultaneously expanded by fluid pressure, the forces required to be applied to the segments and to the mechanism operating the segments can be remarkably reduced. As a result, the wear of the parts which are not easily lubricated but which move mostly in a sliding manner can be reduced, and the life of the mechanism can be increased.

Referring now to FIGS. 5-8, an embodiment of the invention having rollers in the core mold will now be described. The numeral 111 designates a forward core mold having placed thereon a thermoplastic pipe 9, such as a rigid poly-vinyl chloride pipe which is first heated and softened and then forced over the core mold. A socket portion of the pipe for subsequent connection to other pipes is thereby formed. The forward core mold 111 is formed as a cylindrical body having a hollow space, within which a rotating body 131 is provided. Bearings are provided between the internal surface of the forward core mold 111 and the rotating body 131, so that the latter can rotate around its axis relative to the forward core mold 111. The rotating body 131 is driven through gear wheels 132 and 133 and coupling 134 by an electric motor 135. A core 141 is provided within the rotating body 131 so as to be slidable axially but fixed rotationally relative to the rotating body. Axial reciprocating motion is provided by means of a fluid pressure cylinder 143 via a coupling 142. A key 144 integral with said core 141 slides within a slot in the rotating body to permit axial movement while at the same time locking the core 141 and the rotating body 131 to rotate as a unit. The core 141 includes a core body 411 which is illustrated as having the shape of an eight sided truncated pyramid. Each side acts as a cam surface to convert the reciprocating movement of the core 141 into projected outward movement of mounting pieces 151. As will be apparent other cam arrangements could be used, but basically the core body is of a pyramidal shape. As used herein that term would include a conical shape as well as a multisided shape.

The mounting pieces 151 support rollers 152 for forming the groove in the end of pipe 9. The mounting pieces 151 being slidably received in eight holes 137 of rectangular cross section provided around the circumference of the rotating body 131, and urged toward the axis of the core 141 under the action of the tension springs 153.

Each roller 152 is rotatably supported by a respective one of the mounting pieces 151 in a manner such that the roller 152 partly projects out of the mounting piece 151. When the core 141 is displaced forwardly toward the forward core mold 111, the mounting pieces 151 are forced radially outwardly along oblique surfaces of the core body 411 until the rollers 152 project outwardly from the forward core mold 111 and a rearward core mold 113.

Numeral 106 designates a split outer mold having an annular groove 161 along the inner surface thereof. The outer mold 106 is placed on the end of the thermoplastic pipe 9 at a position where the annular groove confronts the rollers 152, and is tightened or released by means of a driving device not shown. The rearward core mold 113 is disposed outside of the rotating body 131, and the outer surface 114 of the rearward core mold 113 defines a diameter equal to that of the greater diameter portion 112 of the forward core mold 111. The rearward core mold 113 is extended rearwardly and formed into a gear box encasing the gear wheels 132 and 133 which rotate the rotating body 131 and the core 141.

The rearward core mold 113 is connected with a pipe 107 for introducing a pressurized fluid for expanding the enlarged portion around the end of pipe 9. Through the pipe 107, the pressurized fluid is introduced into a space 115 defined by the forward and rearward core molds 111 and 113 and the pipe 9, thereby to expand the wall of the pipe. For the purpose of preventing leakage of the pressurized fluid, O-rings 171, 172, 173 and pressure resistant oil-seals 174 and 175 are provided at required positions as shown.

More particularly, O-rings 171 are inserted in grooves provided on the outer surfaces of the forward and rearward core molds 111 and 113, and O-rings 172 and 173 seal between the reciprocating core 141 and the rotating body 131 at forward and rearward ends of the two members. The oil-seals 174 and 175 are provided between the rotating body 131 and internal surfaces of the forward and rearward core molds 111 and 113, respectively, thereby to seal the rotating gaps. In order to improve the operational life and the function of these sealing members, these O-rings and oil-seals are so arranged that they are not subjected to rotating motion and reciprocating motion simultaneously.

The method utilizing the above described arrangement for forming an annular groove in the end of the thermoplastic pipe 9 will now be described.

An end of a thermoplastic pipe 9, which is heated and softened by a device not shown, is forced over the greater diameter portion 121 of the forward core mold 111 and the outer surface 114 of the rearward core mold 113 until the end is placed at a predetermined position with the diameter thereof expanded as desired. The split outer mold 106 is then tightened, and a pressure fulid is introduced into the space 115 through the pipe 107 thereby to expand a part of the tube wall of the thermoplastic pipe 9.

Simultaneous therewith or just after the expansion, the rotating body 131 and the core 141 are rotated by the electric motor 135. The rollers 152 are thereby rotated. Then the core 141 is forced forward by the fluid pressure cylinder 143 while the rollers 152 continue to rotate. The rollers 152 are thereby pushed radially outwardly to expand the part of the tube wall more than that expanded by the application of the pressure fluid. The radially outward movement of rollers is stopped at a position where the thermoplastic pipe 9 is expanded a desired amount, and the rollers continue to rotate in that position. At that stage, the pressure fluid introduced into the space 115 is reduced.

It is advantageous, for obtaining an accurate configuration of the expanded portion of the pipe wall, that the radial positions of the rollers 152 are so adjusted that a gap or space is left between the bottom surface of the annular groove 161 and the outer surface of the expanded portion of the thermoplastic pipe when the rollers 152 are extended to their maximum radial positions.

The end of the thermoplastic pipe is then cooled. The pipe may be cooled in accordance with various methods such as sending a coolant, such as air or water, into the gap within the groove 161, pouring cooling water on the exposed surface of the thermoplastic pipe, or circulating coolant through passages provided through the forward and rearward core molds 111 and 113.

After the end of the thermoplastic pipe is cooled and hardened, the core 141 is retracted by the operation of the fluid pressure cylinder 143. The rollers 152 are thus contracted under the resilience of the springs 153. The split outer mold 106 is opened, the electric motor 135 is stopped, and the forward and rearward core molds 111 and 113 are pulled out of the end of the thermoplastic pipe.

As described hereinbefore, the part of the pipe wall to be formed into a groove is expanded by the application of a pressure fluid thereby to assist in the formation of the expansion. With the above described procedure, the restoration of the expanded part of the pipe wall to its original position due to the resilience of the pipe material can be minimized and the force required for urging the rollers toward the internal surface of the pipe wall can be reduced. Thus, the generation of heat owing to the external and internal friction can be minimized, and the precise formation of the expanded portion around the end of the thermoplastic pipe is assured.

Furthermore, since the part of the pipe is first expanded by the fluid pressure, the forces required to expand and rotate the rollers can be substantially reduced, and friction between the parts in the mechanism which are difficult to lubricate are reduced. It is thus apparent that the invention contributes to the elongation of the operational life of the apparatus used to practice the present invention.

Furthermore, as described hereinbefore, when a pipe inserted in a mandrel is forcibly expanded in accordance with a method expanding a formed ring made of an elastomer, after the pipe is compressed by an outer mold having an annular groove, there has been a tendency of a part adjacent to the enlarged portion of the pipe, and rising up sharply from the surface contacting the mandrel is subjected locally to an excessive expansion thereby extremely thinning that part of the wall, and in the case where the tube is made of a rigid poly-vinyl chloride resin, whitening that part of the pipe. In accordance with this invention, the part to be expanded is beforehand expanded from the inside of the pipe by application of a fluid pressure, and the above described problem can be avoided.

What is claimed is:

1. A method of forming an annular groove in a thermoplastic pipe comprising,
    (a) fitting said pipe and a core mold having first and second segments with an aperture therebetween relative to one another so that an end of said pipe fits over said core mold with the part thereof to be expanded into said annular groove positioned in the path of multiple radially through said core mold extendable rigid members said members abutting a conical shaped internal core and being presently retracted within said core mold,
    (b) positioning a split outer mold having an annular groove therein around said pipe so that the said annular groove of said outer mold confronts the outer periphery of the said part of said pipe to be expanded into said annular groove,
    (c) applying an increased fluid pressure to the internal side of said part,
    (d) sliding said conical shaped internal core, thereby extending said rigid members radially through said core mold to abut and expand said part, said applying step being continuous substantially for the duration of said extending step,
    (e) hardening said pipe after expansion of said part,
    (f) retracting said rigid members within said core mold, and
    (g) removing said pipe and said core mold from one another.

2. The method of claim 1 wherein said applying step is initiated at least as early as said extending step.

3. The method of claim 1 wherein said rigid members used in said method comprise a plurality of segment elements, each having a surface forming a part of a cylinder of the size of said desired annular groove, said segment elements being positioned within said core member and radially extendable outwardly therefrom to have their surfaces meet to form a continuous cylinder.

* * * * *